United States Patent
Koenig

(10) Patent No.: US 6,237,925 B1
(45) Date of Patent: May 29, 2001

(54) HAND TRUCK HAVING GROUND ENGAGING LEVER FOR TILTING

(76) Inventor: Larry D. Koenig, P.O. Box 1037, Williamsburg, IA (US) 52361

( * ) Notice: Subject to any disclaimer, the term of this patent is extended or adjusted under 35 U.S.C. 154(b) by 0 days.

(21) Appl. No.: 09/332,859

(22) Filed: Jun. 15, 1999

Related U.S. Application Data

(60) Provisional application No. 60/130,229, filed on Apr. 20, 1999.

(51) Int. Cl.$^7$ .................................................. B62B 1/00
(52) U.S. Cl. .................................... 280/47.29; 280/47.28
(58) Field of Search ............................ 280/47.29, 47.28, 280/47.19, 47.33

(56) References Cited

U.S. PATENT DOCUMENTS

| | | | |
|---|---|---|---|
| 1,193,729 | * 8/1916 | Stebler | 280/47.29 |
| 1,539,933 | * 6/1925 | Britton | 280/47.29 |
| 2,197,587 | * 4/1940 | Miller | 280/47.29 |
| 2,607,606 | 8/1952 | Millen . | |
| 2,653,033 | 9/1953 | Chinette et al. . | |
| 2,680,027 | * 6/1954 | De Puydt et al. | 280/47.28 |
| 2,710,106 | 6/1955 | Hanson . | |
| 2,710,759 | * 6/1955 | Bayer et al. | 280/47.33 |
| 3,363,787 | * 1/1968 | Macomber | 280/47.29 |
| 3,419,281 | * 12/1968 | Boyanich, Sr. | 280/47.29 |
| 3,578,353 | * 5/1971 | Lockhart | 280/47.29 |
| 3,746,360 | 7/1973 | Crawford . | |
| 4,762,333 | 8/1988 | Mortenson . | |
| 4,776,603 | * 10/1988 | Watts | 280/47.27 |
| 4,981,412 | * 1/1991 | Hawkins | 280/47.29 |
| 5,118,124 | 6/1992 | Storay et al. . | |

* cited by examiner

Primary Examiner—Brian L. Johnson
Assistant Examiner—Joselynn Y. Sliteris
(74) Attorney, Agent, or Firm—Siemens Patent Services LC

(57) ABSTRACT

A hand truck having ground engaging members which tilt the hand truck under conditions of greater leverage than that available by grasping the frame of the hand truck. The ground engaging members are journaled to the frame of the hand truck. In one embodiment, the ground engaging members assume the entire weight of the loaded hand truck. In another embodiment, the ground engaging members push the front end of the hand truck upwardly, employing the wheels as a fulcrum. In the second embodiment, the wheels remain in contact with the ground. In the first embodiment, the ground engaging members serve also as a fulcrum, allowing the wheels to be elevated off the ground. In both embodiments, the ground engaging members are powered either by a foot operated lever or a hand operated lever. In the first embodiment, the foot or hand operated lever is rigidly fixed to the ground engaging members. In the second embodiment, the foot or hand operated lever is a separate part which moves flippers by a multipart linkage. The flippers engage the ground and elevate one end of the load plate.

4 Claims, 8 Drawing Sheets

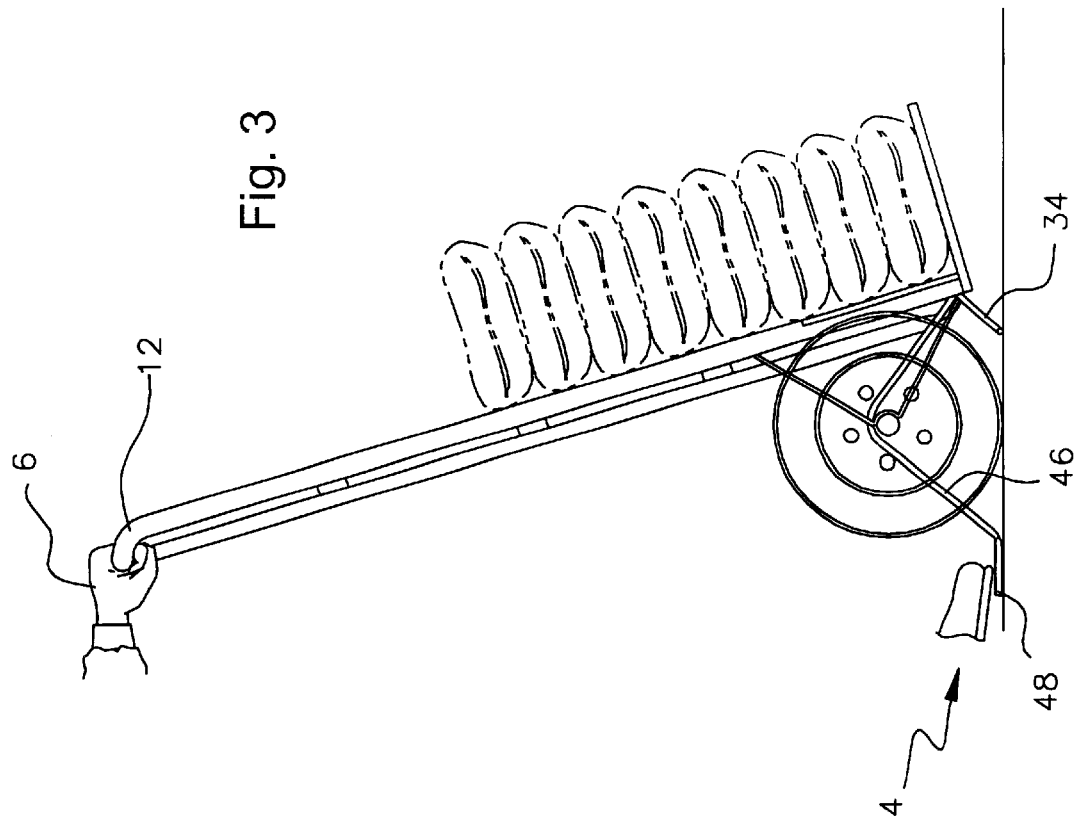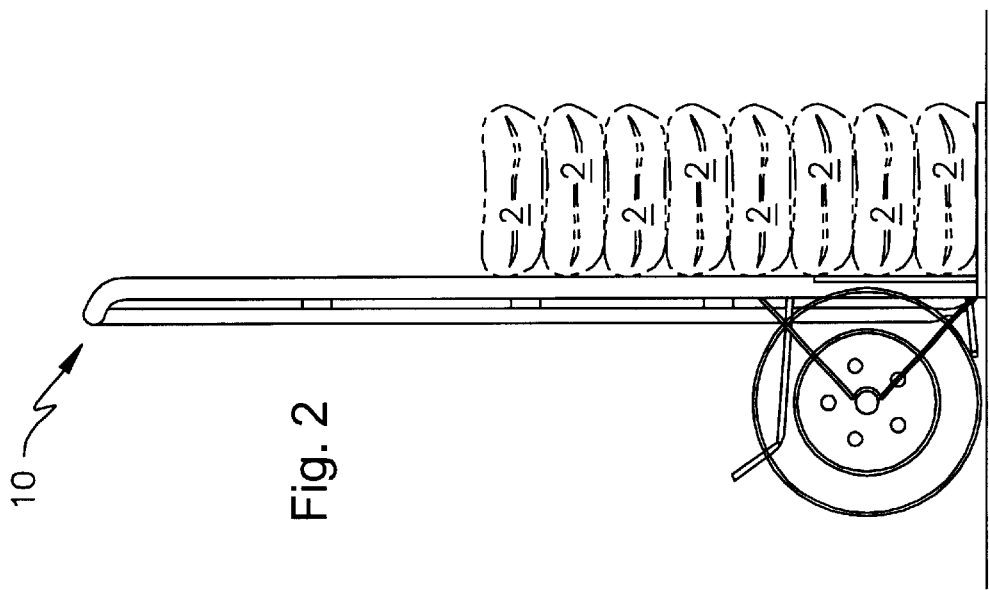

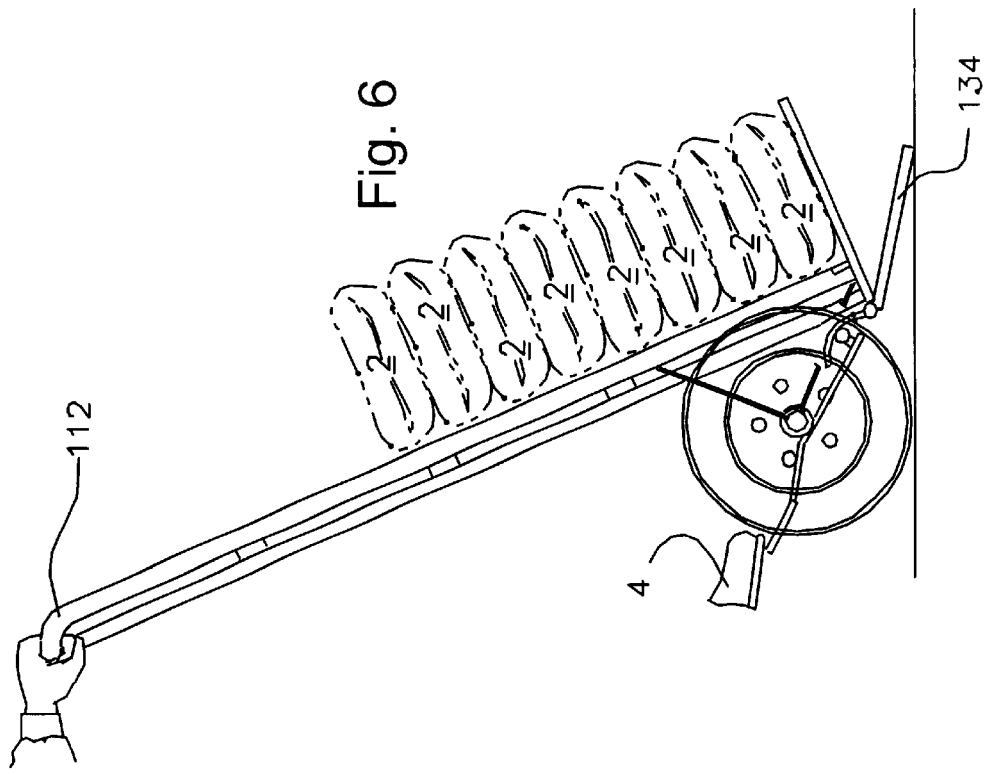
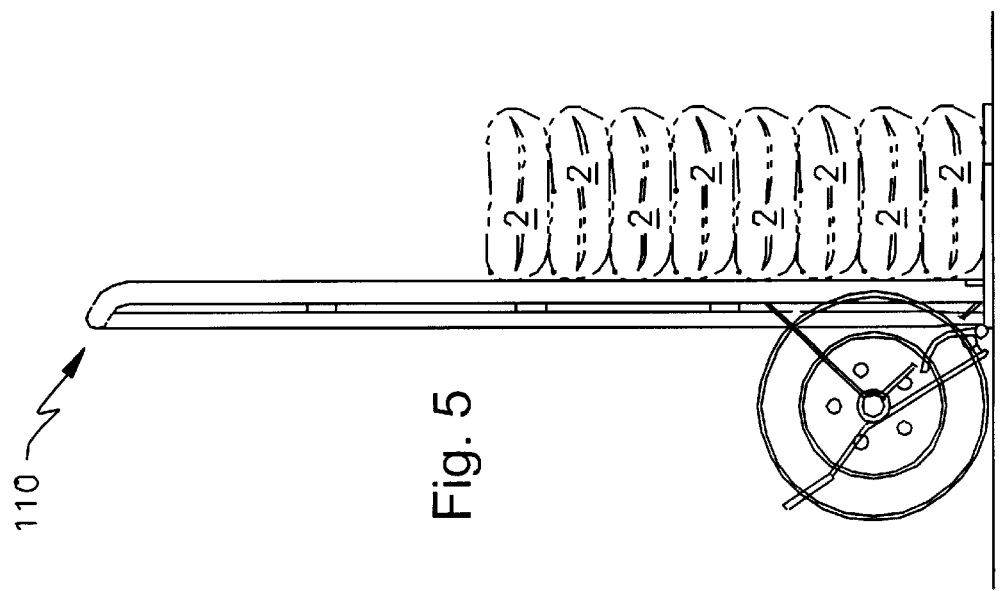

HAND TRUCK HAVING GROUND ENGAGING LEVER FOR TILTING

RELATED APPLICATION

This application is a continuation-in-part of Provisional Patent Application of identical title Ser. No. 60/130,229 deposited with the United States Postal Service on Apr. 20, 1999.

BACKGROUND OF THE INVENTION

1. Field of the Invention

The present invention relates to hand trucks, and more particularly to single axle hand trucks having load shifting apparatus. The load shifting apparatus is employed to assist in inclining the hand truck from a vertical stance in preparation for wheeling the hand truck and its load to a new location.

2. Description of the Prior Art

In operation, hand trucks are usually loaded with bulky and heavy objects when the load bearing frame of the hand truck is substantially vertical. The load is placed on a supporting plate, or load plate. To roll the loaded hand truck to a new location, the hand truck is tilted from its initial vertical stance and drawn by hand. When the hand truck arrives at its destination, where it is unloaded, it is again placed in the vertical stance. It is very difficult for a single person to tilt and upright the hand truck if the load is heavy or particularly bulky. The same holds true when the hand truck is being uprighted after arriving at it destination.

Modifications to hand trucks for shifting loads and the center of gravity have been proposed in the prior art. U.S. Pat. No. 3,746,360, issued to Burdette B. Crawford on Jul. 17, 1973, sets forth an arrangement enabling a load bearing frame of a hand truck to be tilted and supported on a member engaging the ground. However, in the hand truck of Crawford, the main load bearing wheels are mounted on side frames which are vertically slidably connected to the load bearing frame and load plate. By contrast, both the wheels and ground engaging members are rotatably fixed to the load bearing frame in the present invention. The load bearing frame is monolithic in that there are no relatively moving parts corresponding to the side frames of Crawford. The device of Crawford includes a hand operated linkage absent in the present invention. The present invention utilizes a foot operated lever pivotally fixed to the load bearing frame to accomplish load shifting, whereas the device of Crawford causes the main wheels to be retracted relative to the load bearing frame and load plate.

A hand truck seen in U.S. Pat. No. 2,607,606, issued to Stanley S. Millen on Aug. 19, 1952 has an auxiliary axle disposed below the principal axle and located near the load plate, in the manner of the present invention. However, the auxiliary axle supports rollers which supplement the principal wheels. Unlike the device of Millen, the present invention has solid members which selectively engage the ground to prop the novel hand truck relative to the ground when shifting the load as the hand truck is inclined from the vertical stance.

U.S. Pat. No. 2,653,033, issued to Joseph C. Chinette et al. On Sep. 22, 1953, describes a hand truck which is adjustable to vary position of the load plate relative to the principal wheels. However, there is no fixed member which selectively engages the ground when shifting the load as the hand truck is inclined from the vertical, as seen in the present invention.

A hand truck seen in U.S. Pat. No. 2,710,106, issued to Alfred H. Hanson on Jun. 7, 1955, includes spurs fixed solidly to the frame which engage the ground when a load is being shifted. However, these spurs are fixed in their positions, and do not project only when moved by a lever, as occurs in the present invention.

In U.S. Pat. No. 4,762,333, issued to Carl N. Mortenson on Aug. 9, 1988, the wheels are movable relative to the load bearing frame, whereas the wheels are rotatably mounted in fixed location on the load bearing frame in the present invention. Load shifting is accomplished by Mortenson with the weight of the load and hand truck imposed on the wheels. In the present invention, a ground engaging member pivotally mounted to the load bearing frame projects downwardly to engage the ground responsive to operation of a foot lever, so that the load is partially braced against the ground.

U.S. Pat. No. 5,118,124, issued to Craig F. Storay et al. On Jun. 2, 1992, illustrates another hand truck wherein the main wheels are adjustably positioned relative to the load bearing frame. In the device of Storay et al., rockers come to contact the ground and temporarily support the load bearing frame. However, the rockers and wheels are not rotatably or pivotally secured to the load bearing frame in a fixed location, as occurs in the present invention.

None of the above inventions and patents, taken either singly or in combination, is seen to describe the instant invention as claimed.

SUMMARY OF THE INVENTION

The present invention sets forth improvements to hand trucks which enable a single person to tilt the hand truck when the hand truck is loaded. Briefly stated, the hand truck is tilted under conditions of relatively great leverage by a retractable tilting or load shifting mechanism. Final tilting is accomplished after retracting the tilting mechanism by grasping the load bearing frame in conventional manner, which affords reduced leverage compared to that available from the tilting mechanism.

The load bearing frame comprises a single, rigid assembly devoid of longitudinally movable parts. A novel tilting or load shifting mechanism is fixed to the load bearing frame, and is constrained only to pivot or rotate about its axis of pivot. Thus overall construction of the novel hand truck is uncomplicated compared to the many prior art devices which achieve similar results. Moreover, the present invention may be practiced by modifying a conventional hand truck to include the novel tilting or load shifting mechanism.

In some embodiments, the tilting mechanism is foot operated, thereby freeing the hands to grasp the load bearing frame. A foot pedal moves a ground engaging member in a manner shifting the load and the center of gravity. The ground engaging member is arranged to provide a more advantageous lever ratio than is available by grasping the load bearing frame near the top of the upright hand truck. Also, the fulcrum of the leverage arrangement provided by the ground engaging member is more advantageously located relative to the load. Whereas the carriage wheels of the hand truck are usually located well behind the load bearing frame, the fulcrum of the novel leverage arrangement is both closer to the load and lower to the ground than is the axle of the carriage wheels.

Foot operation of the novel leverage arrangement enables a user to control the hand truck by grasping the upper end of the load bearing frame while simultaneously shifting the load with one foot. The hand truck gently tilts towards the user, which position is readily controlled by hand. It is then an easy matter to wheel the hand truck to a new location. The foot controls can then be employed to assist in slowly and carefully elevating the loaded hand truck into an erect position, as well as tilting it from the erect position.

The leverage arrangement may be hand operated. While the principles are similar, the hand arrangement avoids interference of foot pedals with environmental elements in some situations. In the hand operated embodiment, an elongate lever corresponding to the foot pedal projects upwardly, generally parallel to the back of the hand truck, to a location where it is conveniently grasped by hand.

The load shifting mechanism operates in one of either of two ways. In one embodiment, ground engaging members lift the wheels of the hand truck off the ground. In this embodiment, the ground engaging members also serve as a fulcrum. In another embodiment, ground engaging members elevate the front of the hand truck, with the wheels remaining in contact with the ground and serving as a fulcrum. In both embodiments, the ground engaging members selectively project downwardly to engage the ground and to assume at least part of the burden of weight of the loaded hand truck. Each ground engagement style is usable with both hand and foot operators.

Accordingly, it is one object of the invention to enable a single person to maneuver and wheel a loaded hand truck.

It is another object of the invention to free the hands to grasp the load bearing frame when tilting the hand truck from the erect position.

It is a further object of the invention to assist a person in tilting and uprighting a loaded hand truck.

Another object of the invention is to return an inclined hand truck to the upright position by using a foot operated actuator, to assist in maintaining balance and control by the user.

A further object of the invention is to eliminate back strain and other injuries to users of hand trucks.

Still another object of the invention is to provide a tilting mechanism offering a relatively great level of leverage compared to that available by manually grasping and maneuvering the load bearing frame.

An additional object of the invention is to form the load bearing frame as a single, rigid assembly devoid of longitudinally movable parts.

Still another object of the invention is to employ a conventional hand truck in practicing the invention, the improvement being achieved by securing the novel load shifting mechanism to the conventional hand truck.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is an environmental side elevational view of the embodiment of FIG. 1, with the hand truck shown in an upright position.

FIG. 3 is similar to FIG. 2, but illustrates tilting of the hand truck by the novel load shifting mechanism.

FIGS. 5 and 6 correspond to FIGS. 2 and 3, but illustrate the embodiment of FIG. 4.

DETAILED DESCRIPTION OF THE PREFERRED EMBODIMENTS

Figure 1:
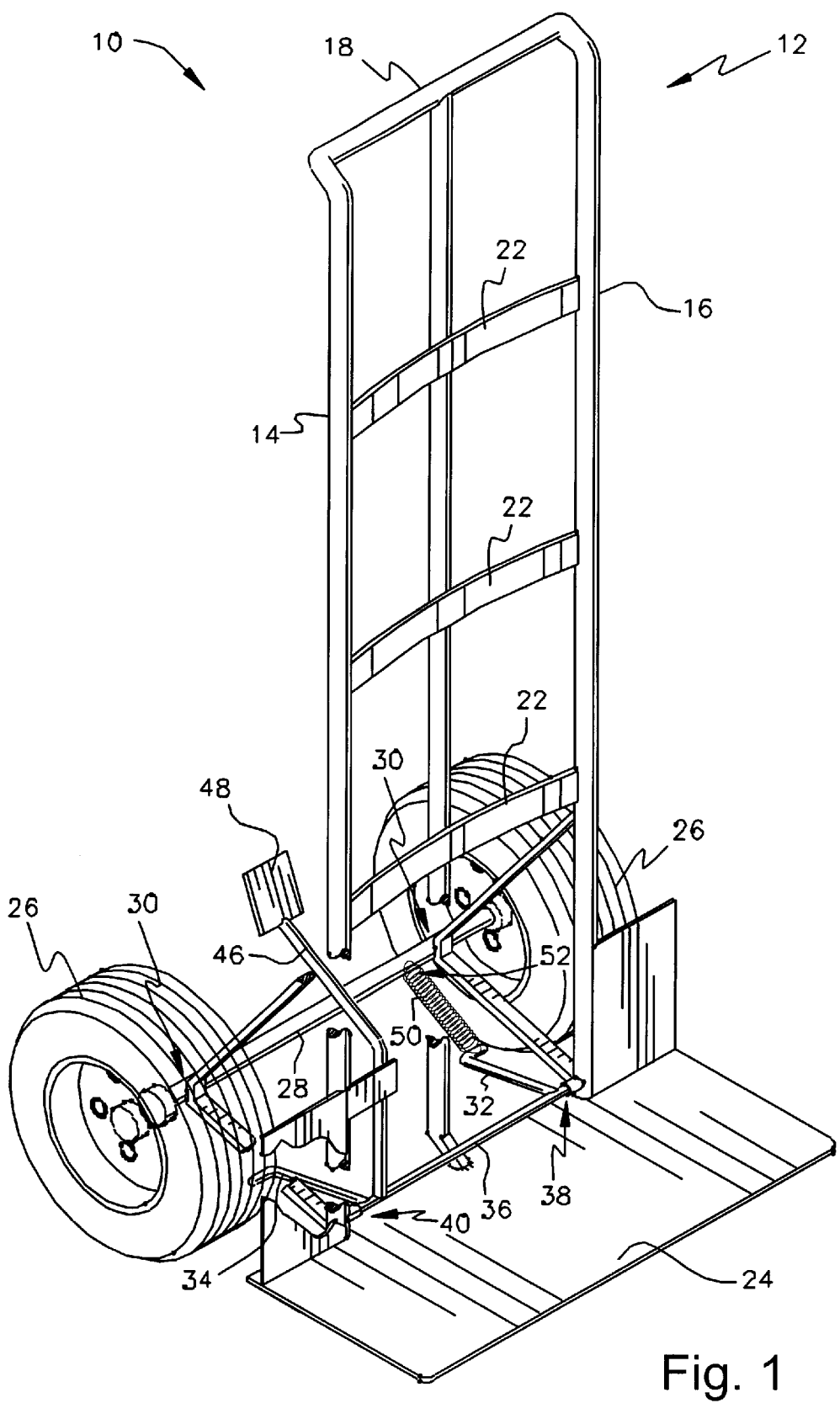
FIG. 1 is a perspective view of one embodiment of the invention, with some components removed to reveal detail.

A first embodiment of the invention is shown in FIG. 1. Hand truck 10 comprises an upright load bearing frame 12 of fixed geometry. As employed herein, "fixed geometry" signifies that the frame is formed as a single part, generally monolithic in construction, with no components which move relative to others. Frame 12 is a box style frame, having right and left vertical channels 14, 16 joined by upper cross bar 18 and a lower cross bar not shown in this view. Horizontal braces 22 span vertical channels 14, 16. Frame 12 is typically formed from steel tubing and is typically assembled by welding. Designation of frame 12 as upright signifies that in normal usage, the longitudinal dimension of frame 12 is vertical, or slightly inclined from the vertical.

A toe or load plate 24 is welded or otherwise firmly fixed to frame 12 at the bottom and on the front side of frame 12. Load plate 24 is generally planar. Articles being transported by hand truck 10 are loaded onto load plate 24 and may be propped against frame 12, if desired.

Two carriage wheels 26 are rotatably mounted to frame 12. Frame 12, load plate 24, and wheels 26 are generally conventional, and need not be more explicitly described herein, other than to note that axle 28 and journaled support of the wheels, indicated at 30, are located on the rear side of frame 12. Axle 28 establishes an axis of rotation of the wheels. It is further noted that attachment and support of the wheels is fixed in location to frame 12. By contrast, some prior art hand trucks (not shown) have axle mountings which are adjustably positioned on their respective frames.

Hand truck 10 is characterized by a novel load shifting arrangement which when operated moves the center of gravity of hand truck 10. The load shifting arrangement includes a retractable ground engaging member which is rotatably mounted to frame 12 at a fixed position. That is, the axis of rotation of the ground engaging member is permanently fixed with respect to its location on frame 12. This location is spaced apart on frame 12 from the location of the carriage wheels.

In the embodiment of FIG. 1, the ground engaging member comprises two arms 32, 34 fixed to an auxiliary axle 36 which auxiliary axle 36 is journaled in supported relation to frame 12 at bearings 38, 40. Auxiliary axle 36 is a convenient member enabling arms 32, 34 to pivot simultaneously and to be supported on a common member. The rotational axis of auxiliary axle 36 and hence of arms 32, 34 is preferably parallel to that of axle 28. Arms 32, 34 are of equal length and project from auxiliary axle 36 at similar angles. Arms 32, 34 are equidistantly spaced from the center of hand truck 10, wherein the center demarcates right and left lateral sides of hand truck 10, arm 32 being located on the left lateral side and arm 34 being located on the right lateral side of hand truck 10. Weight of hand truck 10 will thus be evenly distributed on arms 32, 34, and no imbalance or lateral tilting will occur.

Bearings 38, 40 are fixed to frame 12. A consequence of this arrangement is that wheel axle 28 and auxiliary axle 36, although rotatable, are both stationary in their mounting location on frame 12.

An operating lever 46 is welded to auxiliary axle 36. Operating lever 46 is operated by foot, and terminates in a foot pad 48. Operating lever 46 is a foot lever which extends no more than two feet above the ground, the overall height of hand truck 10 being four feet or more when upright. Operating lever 46 is operated by depressing the same by placing the foot on pad 48 and imposing weight or force on pad 48. Moving operating lever 46 in this manner causes arms 32, 34 to pivot into a first position engaging the ground and lifting hand truck 10 upwardly such that wheels 26 no longer contact the ground. In the first position, arms 32, 34 project downwardly when frame 12 is in its usual upright orientation. It is an easy matter to tilt hand truck 10 by grasping the upper portion of frame 12 by hand after the weight of hand truck 10 is transferred onto arms 32, 34.

A second position of arms 32, 34 is that which exists when arms 32, 34 are not being employed to shift the load. In the second position, arms 32, 34 project horizontally or otherwise away from the downward direction of the first position. A return spring 50 is anchored to arm 32 at one end and at the other end to any convenient point fixed to frame 12, such as to axle 28 at a point indicated by 52. Spring 50 retracts arms 32, 34 from the first or deployed position to the second or stowed position.

Of course, spring 50 could be anchored to any component solidly fixed to arm 32 in place of being anchored directly to arm 32. For example, spring 50 could be anchored to arm 34, lever 46, or to a projection (not shown) fixed to auxiliary axle 36.

One of the significant advantages of the present invention is that the hands are left free to control and maneuver hand truck 10 without the user being obliged to attempt to place his or her feet as far away from hand truck 10 as possible in order to develop sufficient mechanical advantage over the weight of hand truck 10, particularly when hand truck 10 is laden. Part of this advantage accrues from location of auxiliary axle 36, and consequently its axis of rotation, these being between axle 28 and load plate 24. Another contribution to this advantage springs from leverage ratio established by relative lengths of lever 46 and arms 32, 34, the former being greater than the latter. Effectiveness of the load shifting arrangement can be further enhanced by making the leverage ratio of lever 46 greater than that of the leverage ratio of frame 12. The leverage ratio of frame 12 is the ratio of the distance from cross bar 18 to the rotational axis of axle 28, this distance being divided by the distance from axle 28 to toe plate 24.

FIGS. 2 and 3 illustrate operation of hand truck 10. Hand truck 10 is shown in FIG. 2 to be laden with bags 2, standing in the upright position on the ground. When a user places his or her foot 4 onto pad 48 and depresses operating lever 46, hand truck 10 will incline as shown, with its weight being borne by arms 34 and 32 (arm 32 is concealed behind arm 34 in the view of FIG. 3). The user then controls and maneuvers hand truck 10 by grasping the upper portion of load bearing frame 12 with one or both hands 6.

Figure 4:
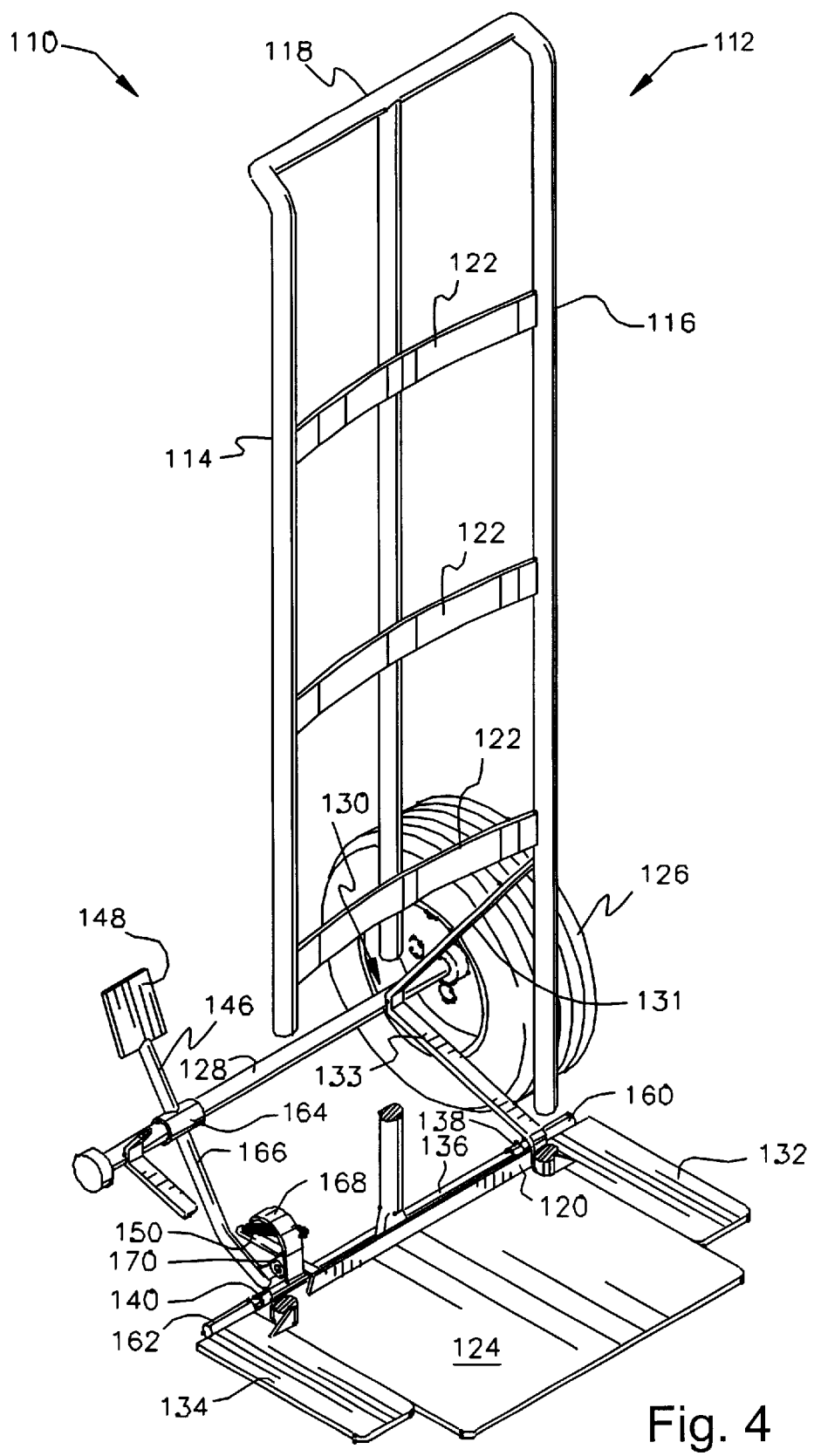
FIG. 4 is a perspective view of a second embodiment of the invention, with some components removed to reveal detail.

FIG. 4 illustrates a second embodiment of the invention. Hand truck 110 of FIG. 4 shares with the embodiment of FIG. 1 a conventional load bearing frame 112, load plate 124, and wheels 126 (only one wheel 126 being shown in this view). Hand truck 110 also has a load shifting arrangement having ground engaging members, but the nature of the load shifting arrangement differs from that of the embodiment of FIG. 1. In the embodiment of FIG. 4, the ground engaging members do not lift the wheels of hand truck 110 out of contact with the ground. Also, operating lever 146 is a member separate from the ground engaging members and the auxiliary axle on which they are mounted.

Load bearing frame 112 of hand truck 110 includes right and left vertical channels 114, 116 and upper and lower cross bars 118, 120. Horizontal braces 122 span channels 114, 116. A load plate 124 is secured to frame 112. A carriage wheel 126 supported having axle 128 is journaled, or rotatably supported at a boss or weldment 130. Weldment 130 is fixed to frame 112 by struts 131, 133. As in FIG. 1, there are two carriage wheels 126 disposed in bilateral symmetry, one wheel being omitted from the view to reveal detail.

The load shifting arrangement of hand truck 110 includes two arms 132, 134 fixed at their proximal ends to auxiliary axle 136. Auxiliary axle 136 rotates on bearings 138, 140 which are supported on frame 12.

Load plate 124 is located inside arms 132, 134. Arms 132, 134 are fixed to auxiliary axle 136 at exposed ends 160, 162 of axle 136. When auxiliary axle 136 is rotated, arms 132, 134 will contact the ground at their distal ends and push downwardly on the ground, thereby elevating the front end of hand truck 110, the front end being that including load plate 124.

Auxiliary axle 136 is rotated by the following arrangement. An operating lever 146 is journaled on or rotatably mounted to frame 12. In the embodiment of FIG. 4, this is accomplished by mounting lever 146 on axle 128 of hand truck 110. Operating lever 146 includes a collar 164 which encircles axle 128. An actuating arm 166 is fixed to collar 164 and projects therefrom so as to contact an actuating projection 168 secured to auxiliary axle 136. Actuating arm 166 is positioned to contact and drive actuating projection 168 when operating lever 146 is depressed. Actuating arm 166 terminates in a roller 170. Actuating projection 168 is a curved follower which cooperates with roller 170. Roller 170 rides across the concave curved surface of actuating projection 168, thereby moving actuating projection 168 and rotating auxiliary axle 136. Arms 132, 134 pivot accordingly, exerting a force urging load plate 124 upwardly.

Operation of the embodiment of FIG. 4 is shown in FIGS. 5 and 6. Referring first to FIG. 5, hand truck 110 is shown laden with bags 2, standing in an upright posture. When operating lever 146 is depressed by the user's foot 4, arms 132, 134 rotate and press against the ground, elevating load plate 124. Hand truck 110 is thereby tilted rearwardly, from which position it is readily controlled and maneuvered by hand.

FIGS. 7–10 illustrate a third preferred embodiment of the invention. Hand truck 210 of FIG. 7 includes a conventional load bearing frame 212, load plate 224, and wheels 226 (only one of which is shown in this view) which are located on opposite sides of frame 212. Truck 210 also has a load shifting arrangement having ground engaging members 232, 234 which are similar to arms 132, 134 of the embodiment of FIG. 4.

Frame 212 of hand truck 210 includes right and left elongate bars 214, 216 and upper and lower cross members 222. The upper ends 215, 217 of bars 214, 216 respectively form handles 206, 208 for use to grasp frame 212 when hand truck 210 is used. Upper and lower cross members 222 span elongate bars 214, 216, and also support central upright support 218 which is fixed at its lower end at the rear edge 204 of load plate 224. Bars 214, 216 are fixed at their lower ends to load plate 224 somewhat inboard from rear edge 204 of load plate 224.

On either side of load plate 224 are located ground engaging members 232, 234 which are supported on auxiliary axle 236. Auxiliary axle 236 is retained to rear edge 204 of load plate 224 by bearings 238, 240, 242. Auxiliary axle 236 is axially rotatable within bearings 238, 240, 242. Ground engaging levers 232, 234 are fixed to auxiliary axle 236 at exposed ends 260, 262 thereof such that they will pivot about the axis of auxiliary axle 236 when auxiliary axle 236 is caused to rotate. Each ground engaging member 232, 234 is shorter than the rearto-front length of load plate 224.

Figure 7:
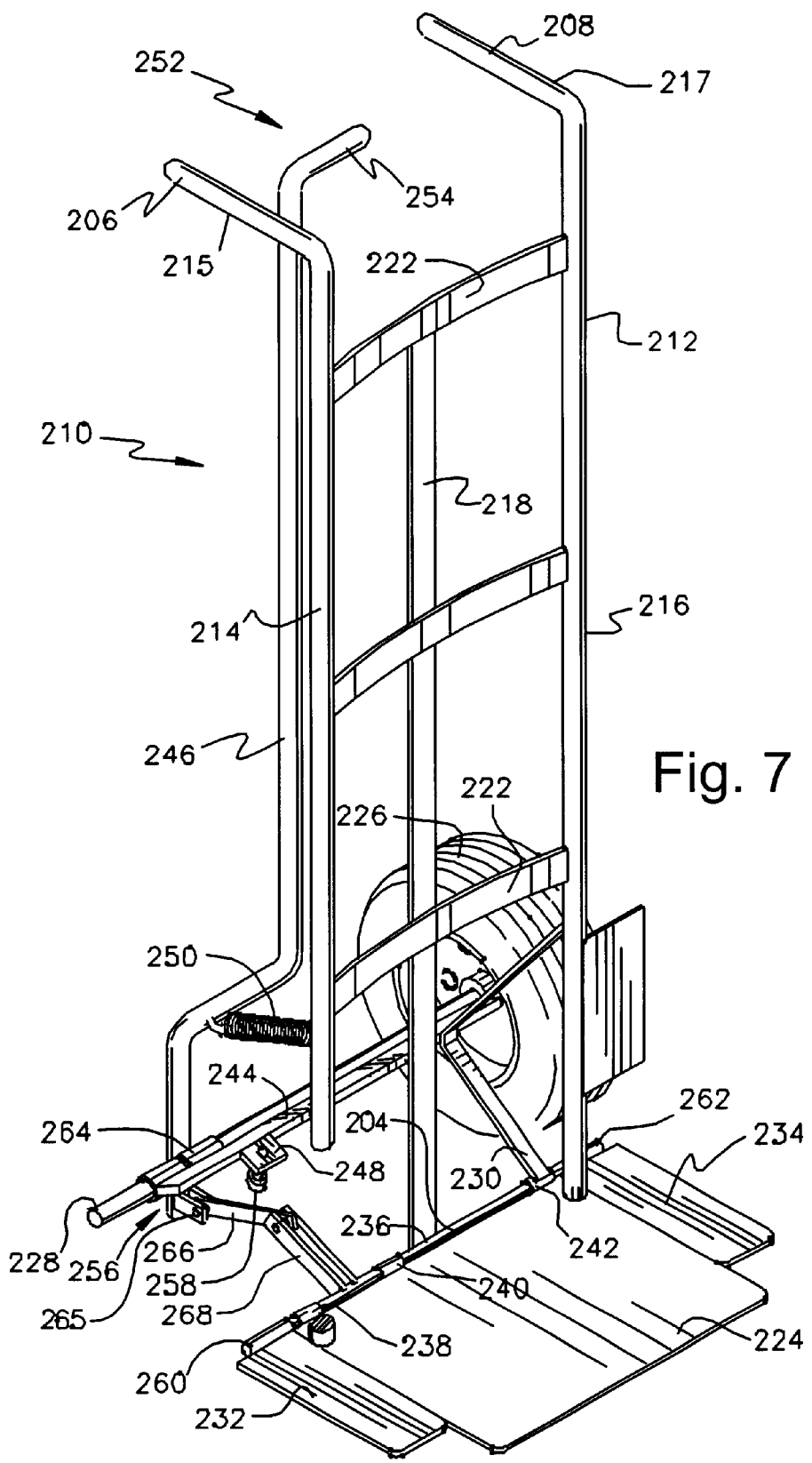
FIG. 7 is a perspective view of a third preferred embodiment of the invention wherein the invention has a hand operable lever to actuate ground engaging members, the right wheel of which is removed to reveal detail.

Wheels 226 are freely rotatable on wheel axle 228. Wheel axle 228 is provided with elongate spacer 244 mounted therealong. Spacer 244 provides support for block 248 into which may be threaded a stop bolt 258. Spacer 244 is fixed to brackets 230 (only one of which is shown in FIG. 7) which depend rearwardly from vertical bars 214, 216 to support axle 228.

An operating lever 246 extends along the right lateral side of frame 212 and projects beyond the upper end thereof. Lever 246 has an upper end 252 which is curved into an operating handle 254 which is generally parallel to load plate 224. Operating lever 246 terminates at horizontally oriented handle 254, which handle 254 extends only part of the width of frame 212. Operating lever 246 is pivotable about axle 228 by means of collar 264 fixed to lever 246 near its lower end 256. Mounted to lower end 256 of lever 246 is first linkage member 265 which interconnects lower end 256 with second linkage member 268 which interconnects with third linkage member 268. The third linkage member 268 connects to auxiliary axle 236. When operating lever 246 is pulled rearwardly from its handle 254 so as to rotate counterclockwise about axle 228, second linkage member 266 transmits clockwise motion to third linkage member 268, causing third linkage member to impart rotation to auxiliary axle 236. Arms 232, 234 pivot responsively about the axis of auxiliary axle 236, thereby lifting the front of load plate 224 above the ground. This action of arms 232, 234 tips frame 212 rearwardly at the upper end of frame 212, and enables the load borne on load plate 224 to be raised more efficiently and safely by the user of hand truck 210.

Once the load is partially lifted, operating handle 254 may be released, whereupon it will return to a rest position due to urging of spring 250. This motion reverses motions undertaken by arms 232, 234.

The use of elongate operating lever 246 provides ample leverage to the user to begin to tilt the load on load plate 224 backwardly such that less effort is needed to move the load to a position more centrally located over axle 228. From this position, hand truck 210 is conventionally maneuvered.

Figure 8:
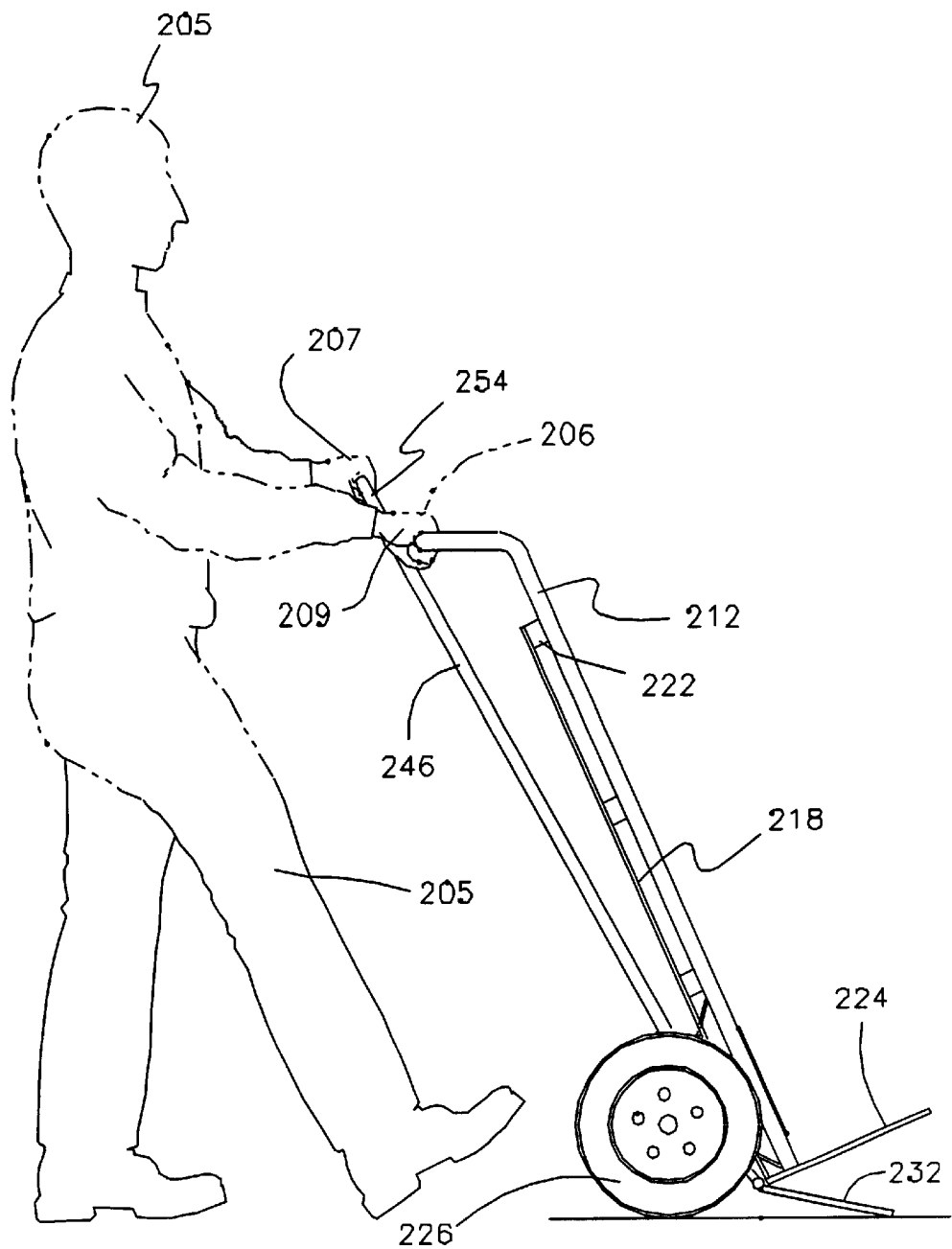
FIG. 8 is a side elevational view of the embodiment of FIG. 7, with a user shown operating the hand operable lever.

FIG. 8 illustrates a user 205 grasping a handle 206 in the right hand 209 while drawing handle 254 rearwardly with left hand 207. The user's left hand 207 causes operating lever 246 to rotate counterclockwise in the depiction of FIG. 8. Lever 232 rotates clockwise responsively, engages the ground, and causes frame 212 to rotate in a counterclockwise manner, thereby also rotating load plate 224 such that the load is shifted in the direction of the rear of hand truck 210.

Figure 9:
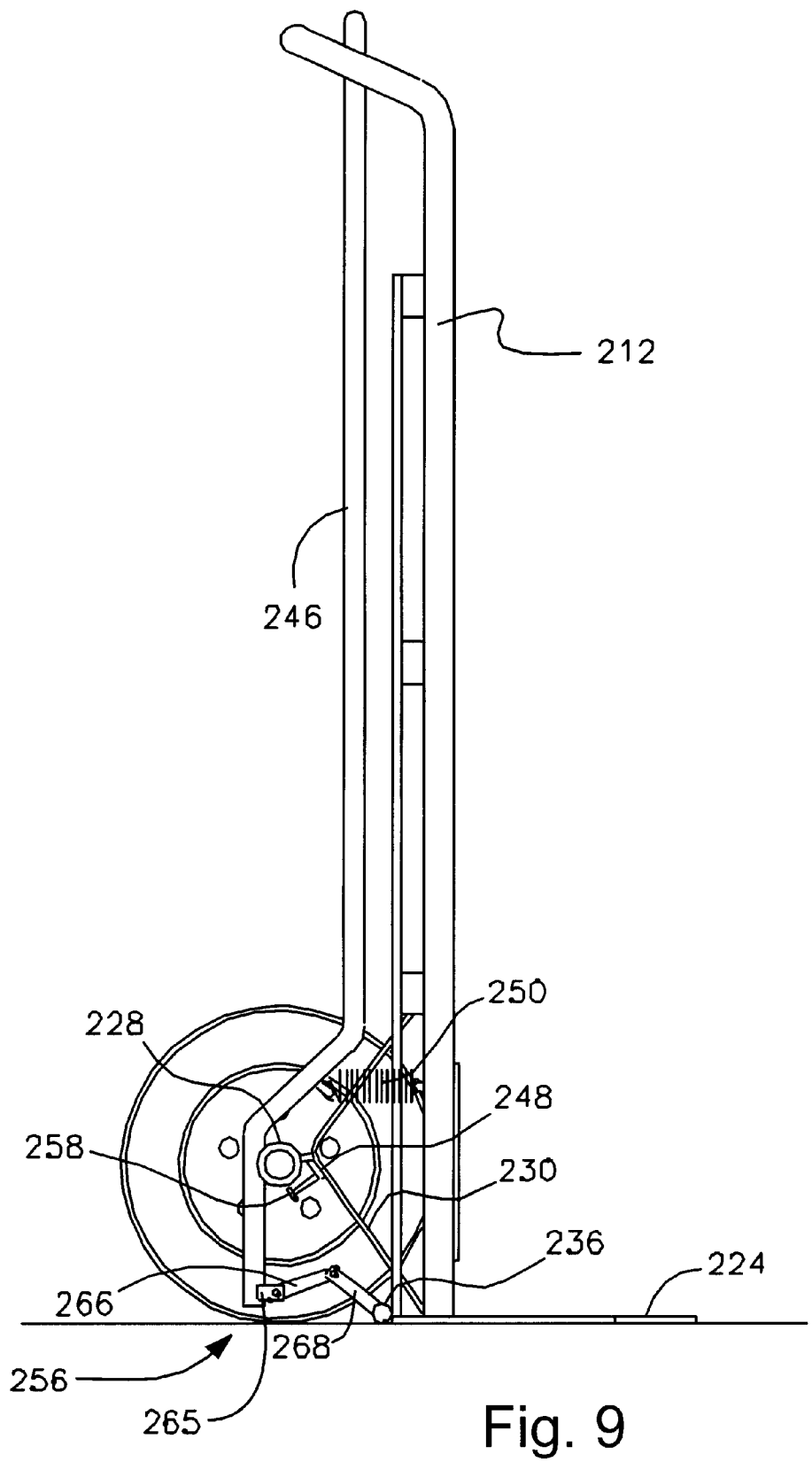
FIG. 9 is a side elevational view of the embodiment of FIG. 7, showing the fully vertical position, with the right wheel removed to reveal detail.
Figure 10:
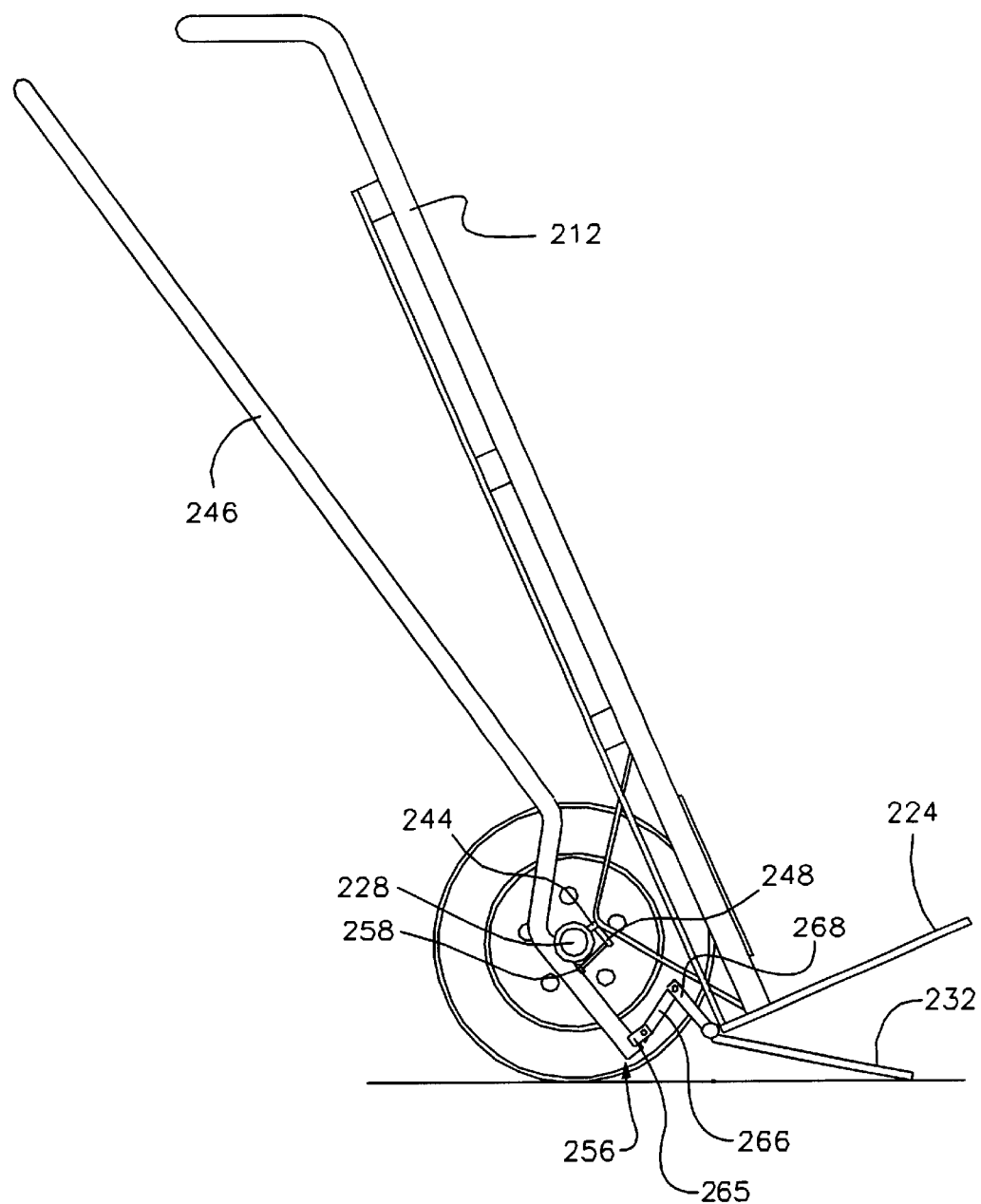
FIG. 10 is a side elevational view similar to FIG. 9, showing the tilted position.

FIGS. 9 and 10 show movement of linkage members 266 and 268. FIG. 9 illustrates a normal position of hand truck 210, wherein frame 212 is generally vertical, and load plate 224 is generally horizontal, both relative to the ground. In FIG. 10, lever 246 has been pulled, thereby rotating counterclockwise, in the view of FIG. 10. Linkage members 266, 268 have moved responsively, forcing ground engaging members 232, 234 (only member 232 is visible in the side elevation of FIG. 10) to lift load plate 224 into an inclined position wherein the load is shifted.

In FIG. 10, it can be seen that a stop is provided to prevent excessive rotation of arm 232. The stop is in the form of a bolt 258 which engages lower end 256 of operating lever 246. Bolt 258 is preferably a threaded bolt which is adjustable within threaded block 248 which in turn is fixed to spacer 244. Excessive rotation of arm 232 about the axis of auxiliary axle 236 would, if not prevented, cause frame 212 to be tilted excessively to the rear, possibly causing an unstable condition which the user could not readily control. Hence bolt 258 is adjusted to stop rotational movement of operating lever 246 about its pivot on axle 228 such that frame 212 is not tilted beyond a stable, controllable position. Of course, bolt 258 could be replaced by any suitable member which interferes with either lever 246 or with any linkage member driving lever 246. The stop feature need not be adjustable.

The present invention is susceptible to further variations and modifications which may be introduced without departing from the inventive concept. For example, indirect actuation of the ground engaging members, as described with reference to the embodiment of FIG. 4, may be applied to the embodiment of FIG. 1. The number of ground engaging members may be varied. For example, in place of two arms 32, 34 or 132, 134, only one arm may be provided. If such is the case, then it would be preferred to locate the one arm such that tilting of the hand truck remains balanced and symmetrical. In further examples, return springs 50, 150 (see FIG. 4) may be connected in any suitable way acting to retract the ground engaging members, and need not be anchored only where specifically described herein.

Operating lever 46 may be attached directly to an arm 32 or 34, rather than to auxiliary axle 36. Similarly, operating lever 146 may be attached to actuating arm 166 rather than to collar 164, if desired. In still further examples, leverage ratios may be altered to suit. The arrangement of actuating arm and its roller 170 may be replaced by an arrangement wherein the various motion translating members are yoked or otherwise connected, rather than being free to separate as occurs in the embodiment depicted in FIG. 4. Alternatively, the reversing function wherein direction of rotation is reversed from the actuating arm and the ground engaging members may be accomplished by gears or other mechanical arrangements.

The nature of lever 246 is such that it would provide a limited measure of control over load plate 224 if it were fixed solidly to load plate 224, rather than in the manner including linkage members 265, 266, 268. This situation could be achieved in the embodiment depicted in FIGS. 9 and 10, for example, by providing a solid arm (not shown)

superseding members 265, 266, 268, or by welding members 265, 266, 268 such that there is no pivot at their connection to each other, to lever 246, and to auxiliary axle 236.

In a further variation, it would be feasible to modify the embodiment of FIG. 1 such that lever 46 extend along frame 12 in the manner of lever 246 of FIG. 7. The resultant hand truck would operate in the manner of the embodiment of FIG. 1, but load shifting would be accomplished by one hand.

It is to be understood that the present invention is not limited to the embodiments described above, but encompasses any and all embodiments within the scope of the following claims.

I claim:

1. A hand truck comprising:

an upright load bearing frame of fixed geometry having a front side, a load plate rigidly fixed to said load bearing frame at said front side, a rear side, a wheel axle, rotatably secured to said frame, and two carriage wheels rotatably mounted to said load bearing frame by said wheel axle; and a load shifting assembly disposed to move the center of gravity of said load bearing frame, said load shifting assembly having bearings fixed to said load plate, an auxiliary axle rotatably supported by said bearings, a retractable first ground engaging member fixed to said auxiliary axle, and a mechanical linkage, wherein said linkage includes a manual operating lever pivotally secured to said wheel axle, a first linkage member fixed to said operating lever, a second linkage member having a first end pivotally joined to said first linkage member and a second end pivotally joined to said auxiliary axle by a third linkage member, said third linkage member having one end pivotally joined to said second end of said second linkage member and another end fixed to said auxiliary axle, wherein said auxiliary axle is disposed to move said first ground engaging member selectively into a first position engaged with the ground and into a second position disengaged with the ground, and wherein said operating lever projects along only one lateral side of and extends upwardly towards the top of said frame, and terminates at a handle extending only part of the width of said frame.

2. The hand truck according to claim 1, wherein said handle is horizontally oriented.

3. The hand truck according to claim 1, further comprising a second ground engaging member spaced apart from said first ground engaging member, wherein said load bearing frame of said hand truck has a center demarcating a right lateral side and a left lateral side of said hand truck, said first ground engaging member and said second ground engaging member are each disposed equidistantly from said center of said load bearing frame, and said first ground engaging member is located on one of said right lateral side of said load bearing frame and said left lateral side of said load bearing frame and said second ground engaging member is located on another lateral side of said load bearing frame.

4. The hand truck according to claim 1, further comprising a stop disposed to limit movement of said operating lever to prevent excessive inclination of said frame of said hand truck.

\* \* \* \* \*